Figure 1:
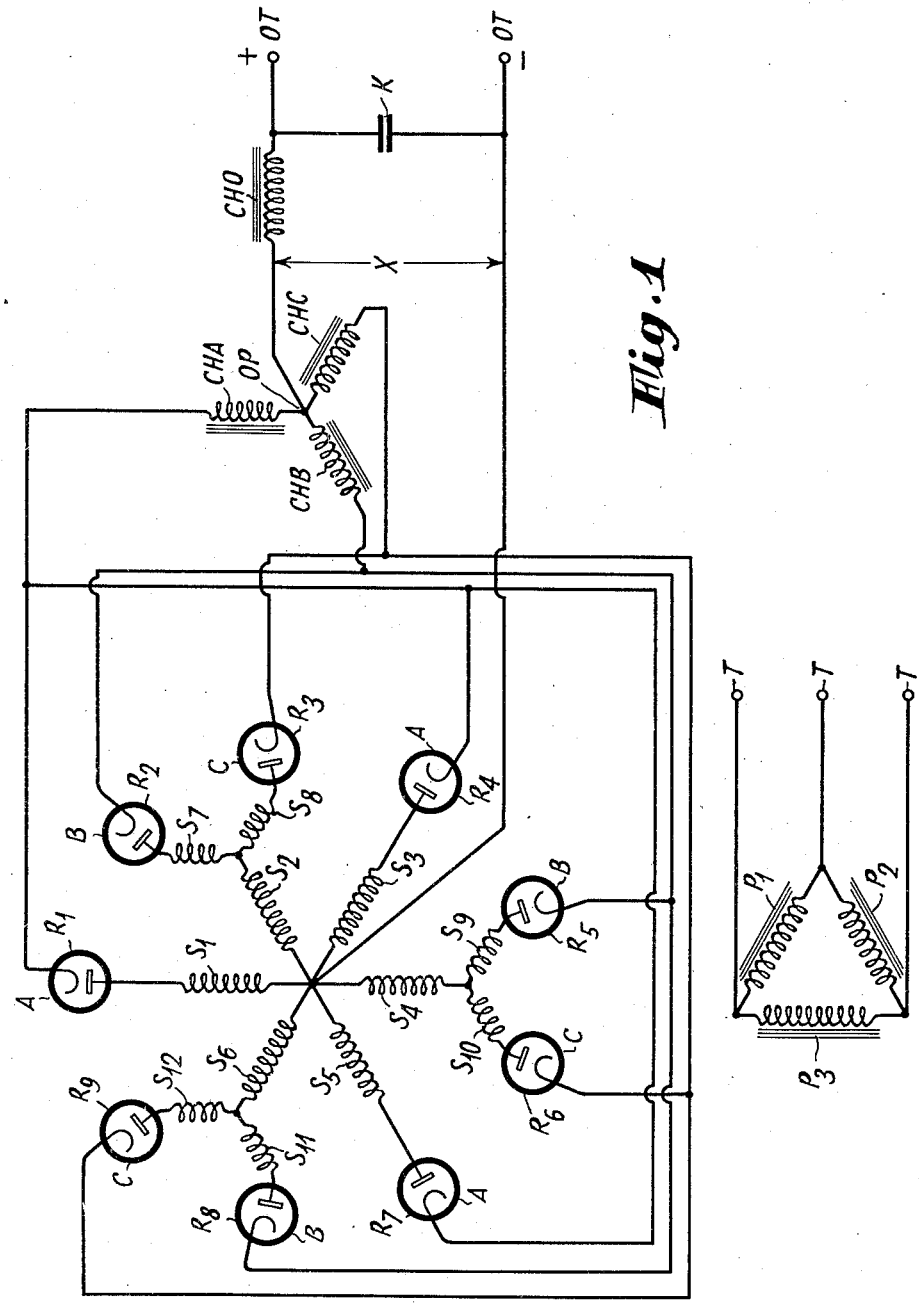

Oct. 17, 1939.   N. H. CLOUGH   2,176,210
RECTIFIER CIRCUIT ARRANGEMENT
Filed April 30, 1938   2 Sheets-Sheet 1

INVENTOR
NEWSOME H. CLOUGH
BY
H.S. Snover
ATTORNEY

Oct. 17, 1939.                    N. H. CLOUGH                    2,176,210
                        RECTIFIER CIRCUIT ARRANGEMENT
                           Filed April 30, 1938                2 Sheets-Sheet 2

INVENTOR
*NEWSOME H. CLOUGH*
BY
ATTORNEY

Patented Oct. 17, 1939

2,176,210

UNITED STATES PATENT OFFICE 2,176,210

RECTIFIER CIRCUIT ARRANGEMENT

Newsome Henry Clough, Brentwood, England, assignor to Radio Corporation of America, a corporation of Delaware Application April 30, 1938, Serial No. 205,191
In Great Britain May 14, 1937

5 Claims. (Cl. 175—363)

This invention relates to rectifier circuit arrangements and has for its objects to provide improved rectifier arrangements capable of giving a minimum of "ripple" content in the unidirectional output while at the same time being inexpensive as regards the transformer and rectifying elements required.

It is, of course, well known that by providing sufficient filtering, a smoothed uni-directional output can be obtained from a rectifier circuit arrangement employing only a few rectifiers. The disadvantage of relying too much upon smoothing filters for eliminating ripple is, however, that where the load is not steady, the necessarily large filter chokes employed introduce transients and although the use of large values of capacity in the filter will reduce such transients, where large power outputs are required, e. g. for electric traction or high power wireless telegraph transmitters, the cost of the necessary condensers becomes high. In general, therefore, it is better to increase the number of rectifying phases in a rectifier arrangement, utilizing the three phase supply which is generally available. In this way the ripple component present before filtering is increased in frequency and decreased in amplitude so that satisfactory smoothing may be achieved by means of a filter of smaller choke value with consequent reduction in transients due to sudden load changes, lowering of cost in the filter and improved overall regulation.

Numerous rectifier circuit arrangements of the multiple phase type have been proposed. For example by employing two secondaries on each limb of a three phase transformer, six phases at 60° can be produced and in the well known "hexaphase" rectifier arrangement this expedient is adopted the six phases being employed in connection with six rectifiers. With this arrangement, however, (employed in connection with the usual output choke) rectifier, and the transformer feeding into it, have to carry the whole load current from one sixth of a cycle and the load current is therefore limited to the maximum which can be passed by one rectifier. Further, as heating in the transformer varies with the square of the current, the high current rushes in successive transformer secondaries engender substantial power loss unless a large and therefore expensive transformer is used.

Another well known arrangement is that in which a double star connection is employed, six phases being produced from a three-phase supply by means of a transformer having secondaries connected in two groups of three each, the connections being such that any two secondaries with 180° relative phase displacement, are connected to the opposite groups. The two corresponding rectifier groups may then be connected to a common load through individual chokes. As the phase relation between the voltages on the two chokes is 180° it is common practice to wind both on a common core so as to balance out the uni-directional magnetic flux component and thus enable a smaller core to be used. This arrangement is more economical in material than the hexaphase arrangement, for here, at any instant, one rectifier in each group is conducting and therefore the output current may be twice the allowable maximum for any one rectifier. Further, as each secondary passes one half the output current for one-third of a cycle the heating due to current rushes is not increased pro rata for increase in output.

Transformers in which more than six phases are produced from a three phase supply by interconnecting windings on different limbs, have been proposed; for example, twelve phases at 30° may be produced by employing six secondaries with one common point (as in the hexaphase arrangement) and connecting to the other end of each of these six secondaries the ends of two additional windings one on each of the two limbs on which the secondary in question is not located, the remaining ends of the additional windings constituting two separate phase output points. Thus, as there are six secondaries, there will be twelve additional windings giving a twelve phase output and each phase may be fed to its own rectifier. Here again, however, each rectifier will carry the full load current in turn and accordingly the same type of inefficiency will be present (and to an advanced degree) as is present in the hexaphase arrangement.

The present invention provides a nine phase rectifier arrangement operable from a three phase supply and which is capable of delivering three times the maximum load current permitted for any one rectifier element.

According to this invention a rectifier arrangement operable from a three phase supply employs nine rectifier elements connected in three groups of three each in a nine phase system in such manner that at any instant one rectifier element in each group is conducting and the groups are connected to a common load circuit through individual impedances, one for each group. If desired, the three impedances are wound each on one limb of a three limb core. The voltage across any one winding in such a three limb core arrangement will not be sinusoidal, being different for positive and negative half cycles, but is composed of the differences between intercepts of sine waves.

The invention is illustrated in the accompanying drawings which show diagrammatically three embodiments of the invention.

Referring to Figure 1 of the drawings, a transformer has a three phase mesh connected primary the windings P1, P2, P3 of which are connected to three phase supply terminals T. There are six secondaries S1 to S6 connected to a common point SP as in the known hexaphase arrangement, the three ends of the alternate secondaries S1, S3, S5, feeding into rectifiers R1, R4, and R7 respectively shown as diodes. The remaining end of each remaining secondary S2, S4, S6 is connected to two subsidiary windings S7, S8, or S9, S10, or S11, S12 (as the case may be) one on each of the two limbs on which the appropriate secondary S2 or S4 or S6 (as the case may be) is not located. The remaining ends of the windings S7, S8, S9, S10, S11, S12, feed into rectifiers R2, R3, R5, R6, R8, R9, respectively as shown, so that a nine phase arrangement is obtained. The nine rectifiers are connected in three groups of three each, the rectifiers of one group being marked A, those of the second being marked B, and those of the third being marked C. Each group feeds into a common point OP through its own winding CHA, CHB, or CHC, on a common core interphase reactance device or choke. Since each limb of this choke carries current continuously it is preferred to include an air gap in the iron circuit of each limb in well known manner. Instead of using a common core choke as indicated three separate chokes CHA, CHB, CHC may be used. A simple final filter consisting of a small choke CHO and condenser K is shown and serves to provide final smoothing of the voltage set up as indicated by the reference X. The amount of final smoothing required will, in any case, be quite small. The output terminals are marked OT.

The invention is not limited to the precise circuit shown; for example, the individual impedances CHA, CHB and CHC may be either in the positive leads or in the negative leads (each group of three rectifying elements and transformer windings has one positive and one negative D. C. output terminal) and similarly the rectifying elements may be on the positive or on the negative side of the D. C. load resistance. In the latter case, mercury pool or water cooled earthed anode rectifiers may be employed.

The invention is not limited to the precise arrangement shown. For example, the transformer secondary arrangement illustrated—this arrangement forms per se no part of this invention and is in accordance with well known technique—could be replaced by any other suitable arrangement, either with one core, or with three cores, or even with nine cores, and adapted to produce nine symmetrical phases.

Figure 2:
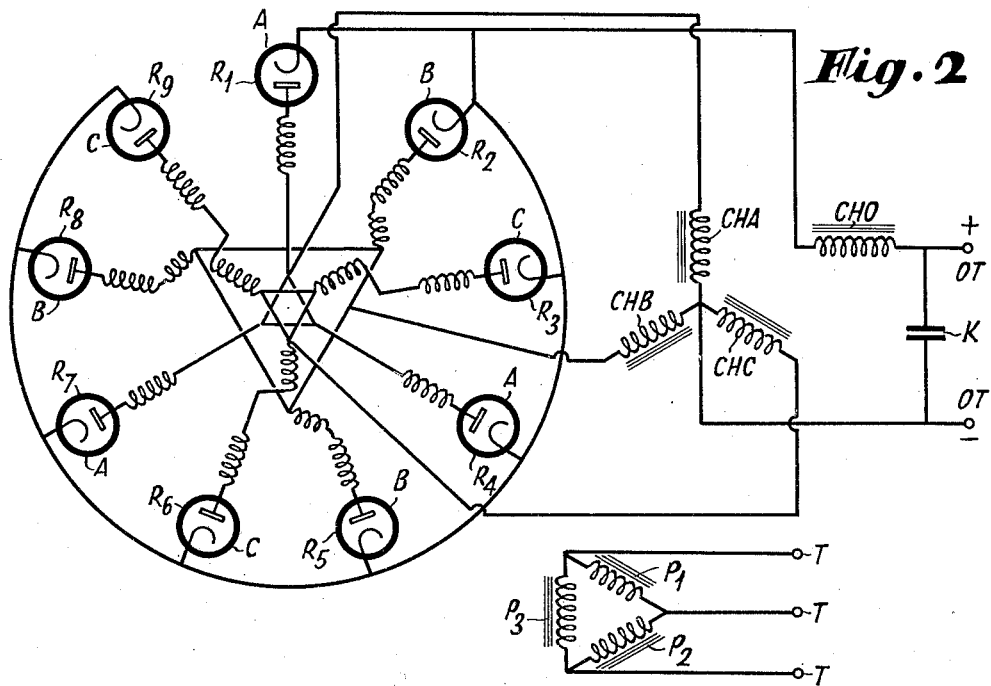

The accompanying Figure 2 shows one possible modification of the arrangement shown in Figure 1 of the drawings. In the accompanying Figure 2 the choke elements CHA, CHB, CHC are in the negative leads and the transformer windings and rectifiers are in groups of three, each group having one positive and one negative terminal. As the accompanying Figure 2 is in conventional diagrammatic form and the group letters A, B, C, and other references thereon correspond to those of Figure 1 of the drawings, the said Figure 2 is self-explanatory in view of the description all ready given and further description is unnecessary.

Figure 3:
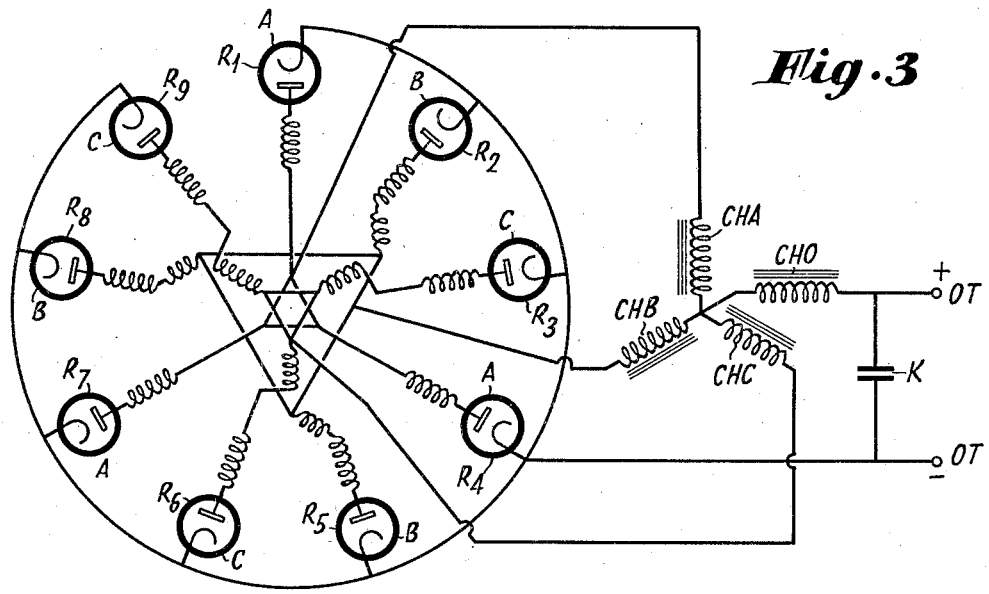

The accompanying Figure 3 differs from the accompanying Figure 2 in that the rectifiers are on the negative side of the load and the chokes on the positive side instead of vice-versa. If the negative side of the load is earthed the rectifier anodes will be earthed.

Having now particularly described and ascertained the nature of our said invention and in what manner the same is to be performed I declare that what I claim is:

1. A rectifier arrangement operable from a three-phase supply comprising nine rectifier elements connected in three groups of three each in a nine phase system in such manner that at any instant one rectifier element in each group is conducting, the groups being connected to a common load circuit through individual impedances, one for each group.

2. An arrangement as claimed in claim 1 wherein the three impedances are wound each on a respective limb of a three limb core.

3. An arrangement as claimed in claim 1 wherein the rectifiers are fed via a transformer having a mesh connected three-phase primary for connection to the supply and a secondary arranged to present nine symmetrical phases, said secondary having a neutral point and being connected to the rectifiers at the ends of the phases remote from said point.

4. A rectifier arrangement comprising a source of nine phase energy said source having a separate terminal for each of said phases, a rectifier element connected to each of said terminals and means for connecting the output of each third rectifier taken in sequence together whereby three groups of three rectifiers each is formed such that at any instant of operation one rectifier in each group is conducting, a common load circuit and an individual impedance connected between each of said groups and said load circuit.

5. A rectifier arrangement comprising a source of three phase energy, means for converting the said three phase energy into nine phase energy, said means having a separate terminal for each of said phases, a rectifier element connected to each of said terminals and means for connecting the output of each third rectifier taken in sequence together whereby three groups of three rectifiers each is formed such that at any instant of operation one rectifier in each group is conducting, a common load circuit and an individual impedance connected between each of said groups and said load circuit.

NEWSOME HENRY CLOUGH.